United States Patent Office 3,088,948
Patented May 7, 1963

---

3,088,948
PRODUCTION OF TRIS-2-HYDROXYALKYL ISOCYANURATES
Edwin D. Little, Hopewell, and Bing T. Poon, Colonial Heights, Va., assignors to Allied Chemical Corporation, New York, N.Y., a corporation of New York
No Drawing. Filed Oct. 23, 1959, Ser. No. 848,214
7 Claims. (Cl. 260—248)

This invention relates to the production of new and useful tris-2-hydroxyalkyl isocyanurates.

Among the objects of the present invention are to provide tris-2-hydroxyalkyl isocyanurates, and to provide a simple and economical method for their production. Other objects will be apparent from the following detailed description.

The tris-2-hydroxyalkyl isocyanurates of this invention may be represented graphically by the following general formula:

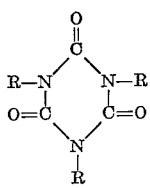

wherein R represents a hydroxyalkyl radical containing at least 2 carbon atoms, preferably 2 to 4 carbon atoms.

According to the present invention, the tris-2-hydroxyalkyl isocyanurates can readily be produced in high yield by reacting cyanuric said with an alkylene oxide, preferably containing 2 to 4 carbon atoms, at temperature of about 25° to 140° C. in the presence of an inert solvent for the cyanuric acid and alkylene oxide and an alkaline catalyst.

Cyanuric acid exists in two forms differing by the location of its three hydrogen atoms. In equilibrium, the two forms may be represented as follows:

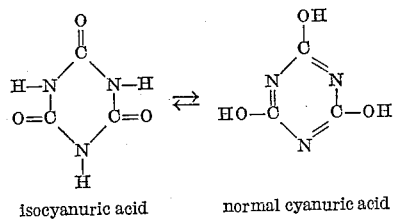

isocyanuric acid     normal cyanuric acid

As indicated above, cyanuric acid reacts with alkylene oxides to form N-derivatives of the acid, i.e. isocyanurates. Support for formation of the isocyanurate structure is found in the major infrared absorption spectra peaks of the products which show the presence of carbonyl triazine ring groups. Moreover, caustic fusion of the products forms monoalkanolamines, pointing to N-linkage of the hydroxyalkyl groups.

The production of tris-2-hydroxyethyl isocyanurate, the preferred compound of the present invention, may be represented by the following equation:

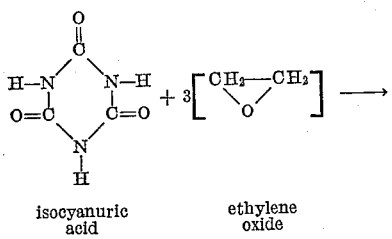

isocyanuric    ethylene
acid         oxide

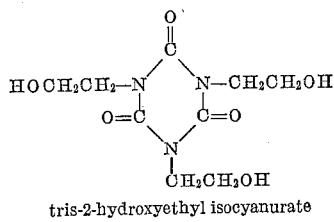

tris-2-hydroxyethyl isocyanurate

The process of this invention is suitably carried out using about 2 to 4 mols of alkylene oxide per mol of cyanuric acid. It is preferred, however, to use about 3 mols of alkylene oxide for each mol of cyanuric acid. Use of this preferred mol ratio enables the obtainment of maximum yields of tris-2-hydroxyalkyl isocyanurates, i.e. upwards of about 55% of theory. Although less than about 2 mols of alkylene oxide per mol of cyanuric acid may be used, substantially lower yields, i.e. below about 40% of theory, are produced. Proportions up to about 5 mols of alkylene oxide per mol of cyanuric acid may also be used but are not advantageous. If the reaction conditions employed are such that some alkylene oxide is distilled from the reaction mixture, additional oxide may be required to complete the reaction.

The reaction of the cyanuric acid and alkylene oxide is carried out at temperature of about 25° to 140° C., preferably at about 100° to 140° C. When reaction temperatures below about 25° C. are employed, the reaction is too slow to be practical. Further, when temperatures above about 140° C. are used, decomposition of the product occurs resulting in substantially reduced yields.

In conjunction with the reaction temperatures set forth above; substantially atmospheric or superatmospheric pressure may be employed. Since the alkylene oxides are more readily soluble in the reaction mixture at elevated pressure, we prefer to operate at such pressure, particularly at pressure between atmospheric and about 100 p.s.i.g.

The reaction may be carried out over a period of time ranging from about ½ hour to about one week, the required time decreasing as the reaction temperature is raised. At the preferred temperatures of about 100° to 140° C., the reaction is carried out for not more than about 3 hours in order to prevent the occurrence of undesirable side reactions.

It is necessary in realizing the desired results of the present invention to carry the reaction out in the presence of an inert solvent for both the cyanuric acid and alkylene oxide. Particularly outstanding results have been obtained using a solvent comprising a lower dialkylformamide (i.e. a dialkylformamide in which each of the alkyl radicals contains from one to four carbon atoms), preferably dimethylformamide. Other suitable solvents include N-alkyl morpholine and N-alkyl oxazolidone-2 in which the alkyl radical contains from one to four carbon atoms (e.g. N-methyl morpholine and N-methyl oxazolidone-2), dimethyl sulfoxide, formamide and diethyl carbonate. The solvent may be suitably employed in weight ratio of about 0.5 to 20 parts per part of total reactants, and preferably about 1 to 9 parts of solvent per part of total reactants. As the amount of solvent is increased, the reaction mass varies from a slurry to a complete solution.

The reaction also requires the presence of an alkaline catalyst, preferably a strongly alkaline catalyst, such as sodium hydroxide, potassium hydroxide, sodium carbonate, calcium hydroxide, tetramethyl ammonium hydroxide and tertiary aliphatic amines such as triethylamine and tripropylamine. Particularly outstanding results have been obtained upon use of alkali metal hydroxides as catalyst. The amount of catalyst can be varied as desired or as conditions may require, but ordinarily the catalyst is employed in an amount corresponding to from about 0.05% to about 3% by weight of total reactants.

In preferred operation, tris-2-hydroxyalkyl isocyanurates are prepared by reacting cyanuric acid with an alkylene oxide selected from the group consisting of ethylene oxide, propylene oxide and butylene oxide, in mol ratio of about 3 mols of alkylene oxide per mol of cyanuric acid. The reaction is carried out at temperature of about 100° to 140° C. and at pressure between atmospheric and about 100 p.s.i.g. in the presence of a lower dialkylformamide (e.g. dimethylformamide) as solvent and an alkali metal hydroxide as catalyst. The solvent is employed in weight ratio of about 1 to 9 parts per part of total reactants.

After the reaction is complete, the reaction mass is cooled. Excess solid alkali metal hydroxide and alkali metal salt of cyanuric acid, if any is present, are removed from the product solution by filtration, Excess solvent is then removed by vacuum or flash distillation, leaving the desired tris-2-hydroxyalkyl isocyanurate as residue.

Tris-2-hydroxyethyl isocyanurate is obtained as a viscous reidue which crystallizes upon cooling. This isocyanurate may be purified by a slurrying with an alcohol such as ethanol or methanol, followed by filtration. Alternatively, it may be purified by recrystallization from the alcohol.

When less than 3 mols of ethylene oxide per mol of cyanuric acid is used, the reaction mass may contain a substantial amount of bis-2-hydroxyethyl isocyanurate. However, it has been found that bis-2-hydroxyethyl isocyanurate crystallizes out prior to the desired tris-2-hydroxyethyl isocyanurate and, hence, may be conveniently removed by fractional crystallization.

In order that those skilled in the art may understand how the present invention can be carried into effect, the following examples are given by way of illustration and not by way of limitation. All parts are by weight.

*Example 1*

A solution of 600 parts of cyanuric acid and about 2800 parts of dimethylformamide was heated to temperature of 130°–140° C. in a reaction vessel equipped with a stirrer, thermometer and dry ice reflux condenser. When the solution attained the desired temperature, 40 parts of potassium hydroxide were added. Then 600 part of gaseous ethylene oxide were gradually introduced below the surface of the liquid at atmospheric pressure and at rate sufficient to maintain the temperature of 130°–140° C. The ethylene oxide addition was completed in 3 hours. The reaction mass was cooled. Excess solid potasium hydroxide and by-product potassium salt of cyanuric acid were removed from the product solution by filtration. Excess dimethylformamide was then removed by vacuum distillation at pot temperature of about 85° C. and pressure of about 12 to 18 mm. Hg to leave a viscose residue which crystallized upon cooling. The resultant crystalline material was recrystallized from ethanol. 779.5 parts of recrystallized product, identified as tris-2-hydroxyethyl isocyanurate, were obtained. This represented a yield of about 64% of theory (based on the cyanuric acid fed).

The recrystallized product melted at 133°–135° C. and gave the following analytical results:

|  | Percent Carbon | Percent Hydrogen | Percent Nitrogen |
|---|---|---|---|
| Found | 41.4 | 5.9 | 15.8 |
| Theory | 41.4 | 5.8 | 16.0 |

Caustic fusion of the product formed monoethanolamine, and the major infrared absorption spectra peaks of the product showed the presence of carbonyl triazine ring groups.

*Example 2*

A solution of 600 parts of cyanuric acid and about 8000 parts of dimethylformamide was heated to temperature of 130°–140° C. in a reaction vessel equipped with a stirrer, thermometer and Dry Ice reflux condenser. When the solution attained the desired temperature, 10 parts of potassium hydroxide were added. Then 600 parts of gaseous ethylene oxide were gradually introduced over a period of three hours below the surface of the liquid at atmospheric pressure, maintaining the temperature at 130°–140° C. On completion of the ethylene oxide addition, the reaction mass was cooled. Excess solid potassium hydroxide and by-product potassium salt of cyanuric acid were removed from the product solution by filtration. About 80% by volume of the dimethylformamide was then flashed off at temperature of 85° C. and pressure of 18 to 20 mm. Hg. The residue was allowed to stand until crude product crystallized out. The resultant crystalline material was then filtered, and 610 parts of crude product were obtained. The filtrate was diluted with an equal volume of chloroform to precipitate an additional 542 parts of crude product as a pasty solid. The combined crude products were recrystallized from ethanol to give 834 parts of purified tris-2-hydroxyethyl isocyanurate, which represented a yield of about 69% of theory (based on the cyanuric acid fed).

The recrystallized product had a melting point of 136°–138° C. Caustic fusion of the product yielded monoethanolamine, and the major infrared absorption spectra peaks of the product show the presence of carbonyl triazine ring groups.

*Example 3*

A solution of 175 parts of cyanuric acid and about 2000 parts of dimethylformamide was heated to temperature of about 135° C. in a reaction vessel equipped with a stirrer, thermometer and Dry Ice reflux condenser. When the solution attained the desired temperature, 3 parts of sodium hydroxide were added. Then 175 parts of gaseous ethylene oxide were gradually introduced over a period of 2 hours below the surface of the liquid at pressure of about 10 p.s.i.g., maintaining the temperature at about 135° C. The reaction mass was cooled, and solid sodium compounds were removed from the product solution by filtration. Excess dimethylformamide was then removed by vacuum distillation at temperature of about 85° C. and pressure of about 12 to 18 mm. Hg to leave 405 parts of crude product as residue. The residue was recrystallized from methanol to give 275 parts of tris-2-hydroxyethyl isocyanurate. This represented a yield of about 78% of theory (based on the cyanuric acid fed).

The recrystallized product melted at 133°–135° C. and contained 16.1% nitrogen.

*Example 4*

A charge comprising 20 parts of cyanuric acid, about 50 parts of dimethylformamide, 20.3 parts of liquid ethylene oxide and 0.1 part of sodium hydroxide was placed in a stainless steel autoclave cooled with Dry Ice. The autoclave was flushed substantially free of air with nitrogen, closed and pressurized to 25 p.s.i.g. with nitrogen. The sealed autoclave was heated in an oven maintained at a temperature of 40°–50° C. for five days. At the end of this time, the pressure was released and the reaction mixture was filtered to remove solid sodium compounds. The filtrate was flash evaporated at a pressure of about 25 mm. Hg to remove the bulk of the dimethylformamide. The syrupy residue was seeded with a small crystal of pure tris-2-hydroxyethyl isocyanurate. After standing overnight, the syrup became largely crystalline. The material was then recrystallized from methanol to give 33 parts of tris-2-hydroxyethyl isocyanurate. This represented a yield of about 81% of theory (based on the cyanuric acid fed).

The recrystallized product melted at 129°–134° C. and contained 16% nitrogen.

Example 5

A charge comprising 13 parts of cyanuric acid, 75 parts of N-methyl pyrrolidone, 13.2 parts of liquid ethylene oxide and 0.01 part of sodium hydroxide was placed in a stainless steel autoclave provided with a stirrer. The autoclave was heated under autogeneous pressure to 100°–120° C. for two hours. Excess N-methyl pyrrolidone was removed by vacuum distillation, and the syrupy residue was seeded with a small crystal of pure tris-2-hydroxyethyl isocyanurate. The resultant material was diluted with a small amount of chloroform, and the crystalline product filtered. The product was then recrystallized from methanol to give 15 parts of purified tris-2-hydroxyethyl isocyanurate, which represented a yield of about 57% of theory (based on the cyanuric acid fed).

The recrystallized product had a melting point of 132°–134° C.

Example 6

A charge comprising 1500 parts of dimethylformamide containing 150 parts of cyanuric acid and 5 parts of sodium hydroxide was placed in a reaction vessel equipped with a stirrer, thermometer and Dry Ice reflux condenser. 197 parts of propylene oxide were gradually introduced over a period of two hours, maintaining the reaction temperature at 130°–135° C. On completion of the propylene oxide addition, the reaction mass was filtered to remove solid sodium compounds. Dimethylformamide was then removed by vacuum distillation at pressure of 15 mm. Hg to leave 313 parts of liquid tris-2-hydroxypropyl isocyanurate. This represented a yield of about 89% of theory (based on the cyanuric acid fed).

The major infrared adsorption spectra peaks of the product indicated the presence of the isocyanurate structure and hydroxyl groups.

Tris-2-hyroxyalkyl isocyanurates may be converted into valuable 2-oxazolidone compounds by heating at temperature in the range of about 150° to 250° C., while distilling the 2-oxazolidone compound from the reaction mixture, as described and claimed in our copending application Serial No. 848,215 of even date.

Since various changes and modifications may be made in the invention without departing from the spirit thereof, the invention is deemed to be limited only by the scope of the appended claims.

We claim:

1. A tris-2-hydroxyalkyl isocyanurate of the formula:

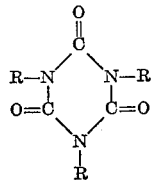

wherein R is a hydroxyalkyl radical selected from the group consisting of hydroxyethyl, hydroxypropyl and hydroxybutyl.

2. Tris-2-hydroxyethyl isocyanurate.

3. A method of preparing a tris-2-hydroxyalkyl isocyanurate which comprises reacting cyanuric acid with an alkylene oxide selected from the group consisting of ethylene oxide, propylene oxide and butylene oxide, in mol ratio of about 2 to 5 mols of alkylene oxide per mol of cyanuric acid at temperature of about 25° to 140° C. in the presence of an inert solvent for both the cyanuric acid and alkylene oxide and an alkaline catalyst, and recovering the tris-2-hydroxyalkyl isocyanurate thereby formed from the resultant reaction mass.

4. A method of preparing a tris-2-hydroxyalkyl isocyanurate which comprises reacting cyanuric acid with an alkylene oxide selected from the group consisting of alkylene oxide, propylene oxide and butylene oxide, in mol ratio of about 2 to 4 mols of alkylene oxide per mol of cyanuric acid, at temperature of about 100° to 140° C. in the presence of a lower dialkylformamide as solvent and an alkali metal hydroxide as catalyst, and recovering the tris-2-hydroxyalkyl isocyanurate thereby formed from the resultant reaction mass.

5. A method of preparing tris-2-hydroxyethyl isocyanurate which comprises reacting cyanuric acid with ethylene oxide, in mol ratio of about 2 to 4 mols of ethylene oxide per mol of cyanuric acid, at temperature of about 100° to 140° C. in the presence of a lower dialkylformamide as solvent and an alkali metal hydroxide at catalyst, and recovering tris-2-hydroxyethyl isocyanurate thereby formed from the resultant reaction mass.

6. A method of preparing tris-2-hydroxyethyl isocyanurate which comprises reacting cynauric acid with ethylene oxide, in mol ratio of about 3 mols of ethylene oxide per mol of cyanuric acid, at temperature of about 100° to 140° C. and at pressure between atmospheric and about 100 p.s.i.g. in the presence of dimethylformamide as solvent and an alkali metal hydroxide as catalyst, the amount of said solvent being about 1 to 9 parts by weight per part of total reactants, and recovering tris-2-hydroxyethyl isocyanurate thereby formed from the resultant reaction mass.

7. A method of preparing tris-2-hydroxyethyl isocyanurate which comprises reacting cyanuric acid with ethylene oxide, in mol ratio of about 2 to 4 mols of ethylene oxide per mol of cyanuric acid, at temperature of about 25° to 140° C. in the presence of an inert solvent for both the cyanuric acid and ethylene oxide and an alkaline catalyst, and recovering tris-2-hydroxyethyl isocyanurate thereby formed from the resulting reacting mass.

References Cited in the file of this patent

UNITED STATES PATENTS

| | | |
|---|---|---|
| 2,381,121 | Ericks | Aug. 7, 1945 |
| 2,414,289 | Ericks | Jan. 14, 1947 |
| 2,716,137 | Patton | Aug. 23, 1955 |
| 2,809,942 | Cooke | Oct. 15, 1957 |
| 2,866,802 | Graham | Dec. 30, 1958 |
| 2,905,671 | Christian et al. | Sept. 22, 1959 |
| 2,977,371 | Dixon | Mar. 28, 1961 |

FOREIGN PATENTS

| | | |
|---|---|---|
| 118,042 | Russia | Feb. 20, 1959 |
| 814,511 | Great Britain | June 3, 1959 |

OTHER REFERENCES

Hofmann: Deutsche Chemische Gesellschaft Berichte, volume 19 (part II), pages 2087 to 2094 (1886).

Smolin et al.: "s-Triazines and Derivatives," pages 403–5, Interscience Publishers, Inc., New York, February 1959.